(12) United States Patent
Steinecke

(10) Patent No.: US 9,251,303 B2
(45) Date of Patent: Feb. 2, 2016

(54) METHOD AND APPARATUS FOR USE IN DESIGN OF A SYSTEM

(71) Applicant: Infineon Technologies AG, Neubiberg (DE)

(72) Inventor: Thomas Steinecke, Woerth (DE)

(73) Assignee: Infineon Technologies AG, Neubiberg (DE)

( * ) Notice: Subject to any disclaimer, the term of this patent is extended or adjusted under 35 U.S.C. 154(b) by 116 days.

(21) Appl. No.: 14/099,290

(22) Filed: Dec. 6, 2013

(65) Prior Publication Data

US 2015/0161308 A1 Jun. 11, 2015

(51) Int. Cl.
*G06F 17/50* (2006.01)

(52) U.S. Cl.
CPC ........ *G06F 17/5031* (2013.01); *G06F 17/5022* (2013.01); *G06F 17/5036* (2013.01); *G06F 2217/78* (2013.01); *G06F 2217/82* (2013.01); *G06F 2217/84* (2013.01)

(58) Field of Classification Search
USPC ......... 716/100–104, 106–108, 110–113, 136, 716/138; 703/13–14, 20
See application file for complete search history.

(56) References Cited

U.S. PATENT DOCUMENTS

| 6,460,173 B1 * | 10/2002 | Schreiber .................. 716/104 |
| 7,174,530 B2 * | 2/2007 | Yamada ............ G06F 17/5045 716/104 |
| 7,392,489 B1 * | 6/2008 | Jackson et al. ............... 716/102 |

* cited by examiner

*Primary Examiner* — Nghia Doan
(74) *Attorney, Agent, or Firm* — Murphy, Bilak & Homiller, PLLC

(57) ABSTRACT

A method is disclosed for use in design of a system, the system to include a plurality of sources contributing to a variable system effect. The method includes determining a plurality of functional units to form the system, obtaining a plurality of constant functional unit source informations, determining at least one variable quantity, associating each functional unit with one of the at least one variable quantity, obtaining variable functional unit source information by combining the constant functional unit source information with the variable quantity associated with the functional unit, and deriving the variable system effect based on combining the variable functional unit source informations. Further a device for use in design of a system is disclosed and also a tangible computer-readable medium storing instruction code thereon, that when executed causes one or more processors to perform steps for design of a system.

21 Claims, 7 Drawing Sheets

METHOD AND APPARATUS FOR USE IN DESIGN OF A SYSTEM

BACKGROUND

System-on-chips, in operation, emit electromagnetic radiation. This electromagnetic emission (EME) can be caused by switching of logic gates. Electromagnetic emissions are typically undesirable. Given a draft design of the system, the draft design may be improved by reducing electromagnetic emission. To this end, an iterative design process can comprise that operation of the draft design is simulated to determine the electromagnetic emission and the draft design is then amended with a view to a reduction of the emission. The simulation requires the draft design to be completed before it can be simulated, even though for improvement of the design, vast amendments may eventually provide for a very different design. The simulation is complex to perform commensurate with the complexity of the draft design.

SUMMARY

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

Described herein are techniques that can be useful, for example, in the field of design of a system. Embodiments disclosed herein encompass a method, a device, an apparatus and a tangible computer-readable medium storing instruction code thereon. The system can have a plurality of sources that, in operation of the system, contribute to an effect of the system. For example, a source in the plurality of sources can be a physical source such as a current in a transistor of an integrated circuit comprised in the system. Also, the effect can be a physical effect such as electromagnetic emission. The plurality of sources can be grouped, each group to form an aggregate such as current flow in a circuit block corresponding to a functional unit. In some implementations for each aggregate of the system, such as each functional unit of the integrated circuit, a constant aggregate source value is known, for example an average current flow to the respective functional unit. Further, based on the constant value such as the average current flow, a dynamic aggregate source value, such as time dependent current flow to the respective functional unit, can be determined. Thus, the system effect such as electromagnetic emission can be derived without having information on the sources that give rise to the effect. In some implementations time dependent current flow as the dynamic aggregate source value depends on clock signals provided to the functional units. A predetermined pulse shape used in the clock signals and/or a individually predetermined skew of the clock signals provided to a respective functional unit can contribute to determine an overall electromagnetic emission of the system as system effect.

In an aspect, a method as defined in the independent method claim is provided. In another aspect, a device as defined in the independent apparatus claim is provided. In yet another aspect, a tangible computer-readable medium storing instruction code thereon as defined in the independent tangible computer-readable medium storing instruction code thereon claim is provided. The dependent claims define embodiments according to the invention in one or more aspects. It is to be noted that features of these embodiments may be combined with each other unless specifically noted to the contrary. For example, elements of method embodiments may be implemented in embodiments of the apparatus. For example, features of an embodiment of the apparatus may be used to perform steps of an embodiment of the method.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

BRIEF DESCRIPTION OF THE DRAWINGS

The claimed subject matter is described below with reference to the drawings. The detailed description references the accompanying figures. The same numbers can be used throughout the drawings to reference like features and components. Further, in different drawings like features or corresponding features can be indicated by reference numerals that have the last two digits in common.

DETAILED DESCRIPTION

For purposes of explanation, numerous specific details are set forth in order to provide a thorough understanding of the claimed subject matter. It may be evident, however, that the claimed subject matter may be practised without these specific details.

Figure 1:
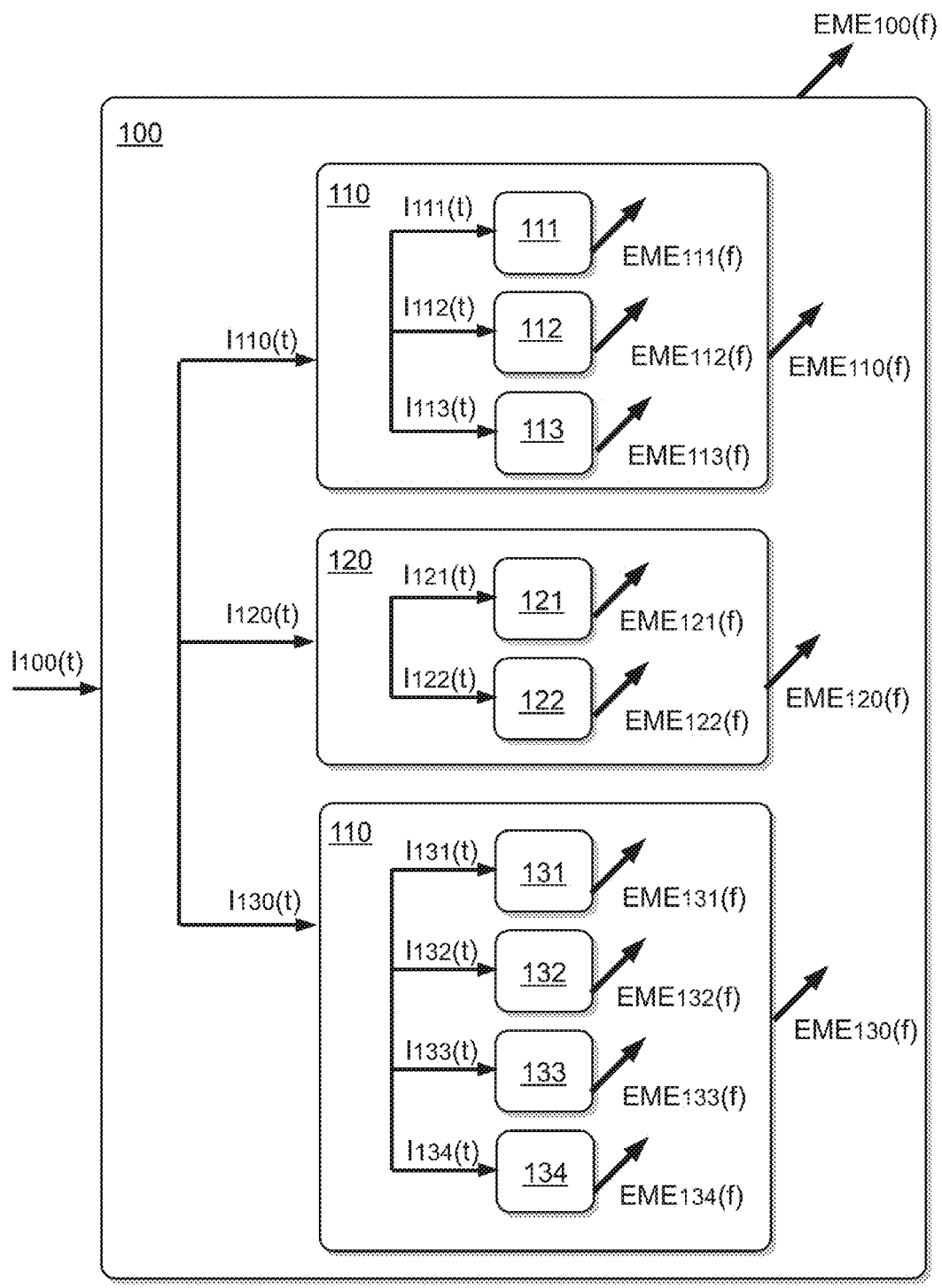
FIG. 1 is a block diagram that illustrates schematically a system in accordance with some embodiments.

FIG. 1 is a block diagram that illustrates schematically a planned system 100 that, in accordance with some embodiments, can be planned as a System-on-Chip (SoC). In some embodiments a microcontroller model for use with the methods disclosed herein can comprise a general clocking information for use in planned system 100 and a module list to state functional units, herein also called modules, to be used in planned system 100. The module list can contain individual current consumption and clocking information for every functional module to be used in planned system 100.

For example, planned system 100 can comprise a first functional unit 110, a second functional unit 120 and a third functional unit 130. Merely by way of example, the first functional unit 110 can comprise a first circuit element 111, a second circuit element 112 and a third circuit element 113. For example, circuit elements 111, 112, 113 comprised in the first functional unit 110 can be transistors for use as input/output drivers. Second functional unit 120 can comprise a fourth circuit element 121 and a fifth circuit element 122. Third functional unit 130 can comprise a sixth circuit element 131, a seventh circuit element 132, an eighths circuit element 133, and a ninth circuit element 134. For example, circuit elements 121 and 122 comprised in the second functional unit 120 as well as circuit elements 131, 132, 133 and 134 comprised in the third functional unit 130 can be transistors for use as logic circuit switches. Thus, from first to ninth circuit element, the circuit elements are herein denoted by reference numerals 111, 112, 113, 121, 122, 131, 132, 133 and 134. Other circuit elements (not shown) can be passive or active, as the case may be. Circuit elements can be form part of and thus also be referred to as combinatorial logic circuitry. The circuit elements each can be provided with current flow that can change with time t. In accordance with coupling of the circuit elements to each other, as the case may be, current can flow between circuit elements 111 . . . 134. Current flow that can change with time can form a source of a frequency dependent spectrum of electromagnetic emission EME111(f) . . . EME134(f) of the respective circuit element. Given knowledge of circuit elements 111 . . . 134 and conditions set, for example, by a supply voltage and/or a clock, current flow to circuit elements 111 . . . 134 can be determined. As a result, an expected electromagnetic emission EME100(f) of planned system 100, when in operation, can be determined.

In the example shown in FIG. 1, in effect, circuit elements 111 to 134 are grouped into a first subset of circuit elements 111, 112, 113 in first functional unit 110, a second subset of circuit elements 121, 122 in second functional unit 120 and a third subset of circuit elements 131, 132, 133, 134 in third functional unit 130. In accordance with coupling of circuit elements to each other current can flow to functional units 110, 120 and 130. A net current flow I110(t), I120(t) and I130(t) can be provided to functional units 110, 120 and 130, respectively, that can change with time t. Thus, each functional unit 110, 120, 130 can provide a contribution EME110(f), EME120(f) and EME130(f) to electromagnetic emission EME100(f). Some embodiments can be based on using the contributions EME110(f), EME120(f) and EME130(f) to determine the spectrum of electromagnetic emission EME100(f) of planned system 100.

Figure 2:
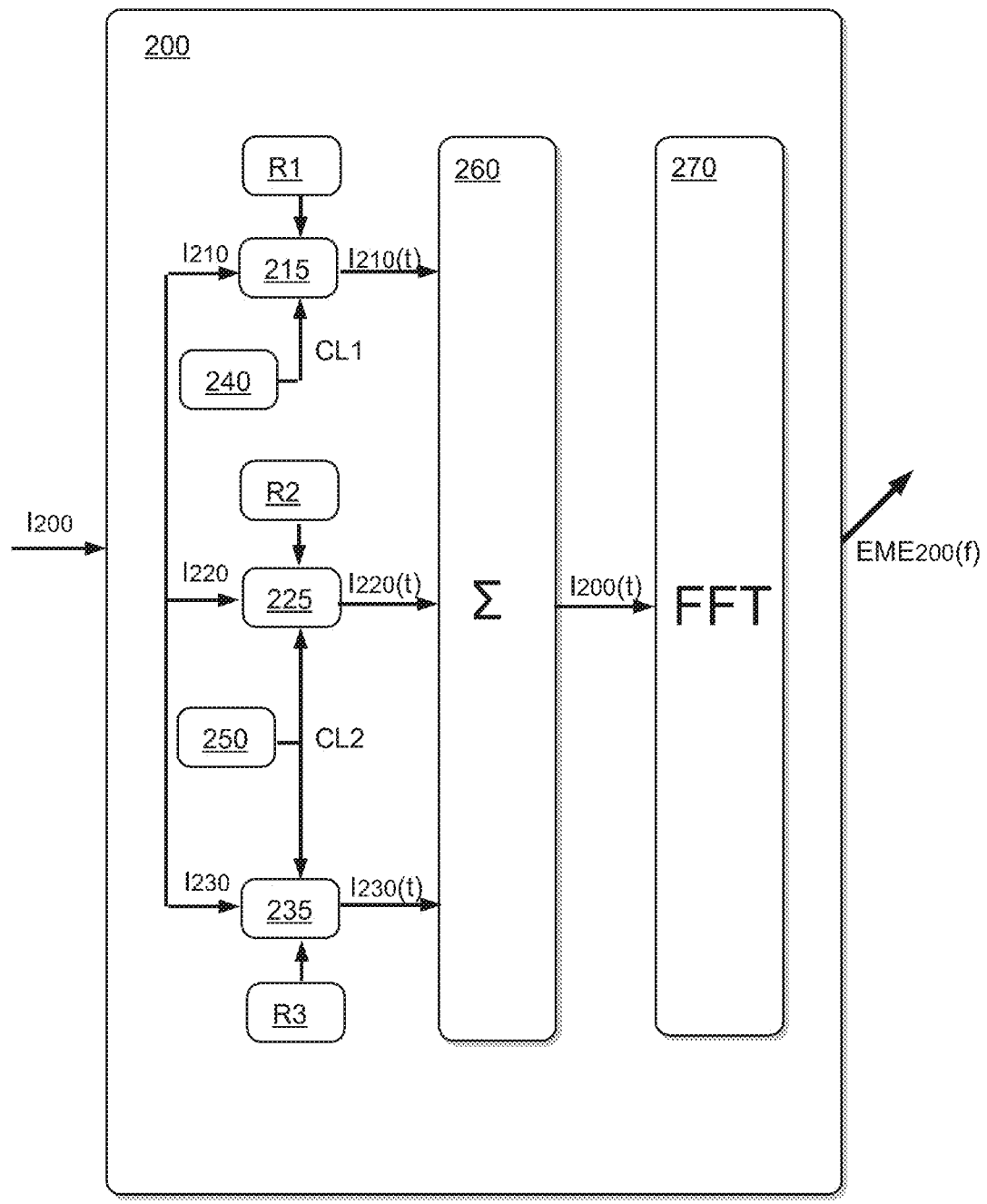
FIG. 2 is a block diagram that illustrates schematically a system model corresponding to the system shown in FIG. 1.

FIG. 2 is a block diagram that illustrates schematically a system model 200 corresponding to planned system 100 shown in FIG. 1. In the system model shown in FIG. 2 function blocks and functional units for use in simulating operational aspects of planned system 100 are depicted. As system model 200 corresponds to planned system 100, so do elements shown in system model 200.

System model 200 can include a main system clock (not shown). General clocking information that describes a system phase locked loop (PLL) can provide the main system clock. Main clock frequency, main clock modulation shape and main clock signal amplitude can be system PLL parameters. Main clock modulation shape can, for example, be one of triangular shape, clipped triangular shape (i.e., triangular shape, however with individual clock pulses being masked or suppressed so as to reset accumulated jitter), bell shape and random shape. The person skilled in the art can contemplate other main clock modulation shapes for use in applying the disclosed methods.

Exemplary system model 200 includes a first clock 240 and a second clock 250. It should be understood that the number of clocks is not limited to two, but can be any number as desired by a user. In an implementation signals to be generated by first clock 240 and/or by second clock 250 can be derived from the main system clock. In the exemplary system model 200 shown in FIG. 2, a clock signal output of first clock 240 is associated with first functional unit 110. Thus, in operation of system model 200, first clock 240 can be used to provide a first clock signal CL1 to simulate operation of first functional unit 110. Further, a clock signal output of second clock 250 is associated with second functional unit 120 and also with third functional unit 130. Thus, in operation of system model 200, second clock 250 can be used to provide a second clock signal CL2 to simulate operation of second functional unit 120 and to simulate operation of third functional unit 130.

Using first clock signal CL1 to simulate operation of first functional unit 110 can be known to require a first average current flow I210. Using second clock signal CL2 to simulate operation of second functional unit 120 can be known to require a second average current flow I220. Using second clock signal CL2 to simulate operation of third functional unit 130 can be known to require a third average current flow I230. Further, a first set of rules R1, a second set of rules R2 and a third set of rules R3 can be determined to apply in operation of first, second and third functional unit 110, 120, 130, respectively, to determine a respective current I210(t), I220(t) and I230(t) to first, second and third functional unit 110, 120, 130, respectively, that varies with time. Currents I210(t), I220(t) and I230(t) are herein also referred to as time dependent currents. To give an example of one rule that can be comprised in first, second and third set of rules R1, R2 and R3, a mean current determined by integrating time dependent current I210(t), I220(t) and I230(t), respectively, across any given time interval covering current flow in only one direction and divided by a length of that time interval should be equal to a predetermined average current flow I210, I220, I230, respectively, in the one direction during the same time interval.

In FIG. 2, system model 200 is shown to include a first black box 215 associated with first functional unit 110, a second black box 225 associated with second functional unit 120 and a third black box 235 associated with third functional unit 130. The wording "black box" is used to reflect a representation of circuitry such as circuit elements 111, 112, 113 in the associated functional unit such as first functional unit 110 and of current flow such as I111(t), I112(t), I113(t) in the associated functional unit that does not need to be known in detail to perform the methods disclosed herein. Black boxes 215, 225 and 235 can be set up for simulation of an operation of system 100 to combine an input of average current I210, I220 and I230 with, as the case may be, a clock signal CL1 or CL2 according to rule sets R1, R2 and R3, respectively, to output an expected variable current, in particular time dependent current I210(t), I220(t) and I230(t), respectively. Next, system model 200 comprises an adder 260 configured to form time dependent current I200(t) as a sum of time dependent currents I210(t), I220(t) and I230(t) associated with functional units 110, 120 and 130, respectively. Further, system model 200 comprises Fast Fourier Transform block 270 configured to perform a fast Fourier transformation on time dependent system current I200(t) to provide the frequency spectrum of electromagnetic emission EME200(f) of system model 200, i.e., the frequency spectrum of electromagnetic emission expected to be emitted in operation of planned system 100.

In an implementation, using variable currents I210(t), I220(t) and I230(t) in a simulation of an operation of system 100, for example for each functional unit 110, 120, 130 a respective expected contribution EME210(f), EME220(f) and EME230(f) to the expected spectrum of electromagnetic emission EME200(f) can be determined by assuming current to other functional units than the respective functional unit to be zero. Some embodiments can be based on using the time dependent system current I200(t) to determine a spectrum of electromagnetic emission EME200(f) which corresponds to electromagnetic emission EME100(f) expected in operation of system 100. The frequency spectrum EME200(f) of electromagnetic emission amplitudes can be indicative of an extent of perturbation as an effect of current expected to flow when operating planned system 100. An envelope of the frequency spectrum can be used to compare effects of variations in system model 200 on electromagnetic emission expected in operation of a corresponding planned system 100.

Figure 3:
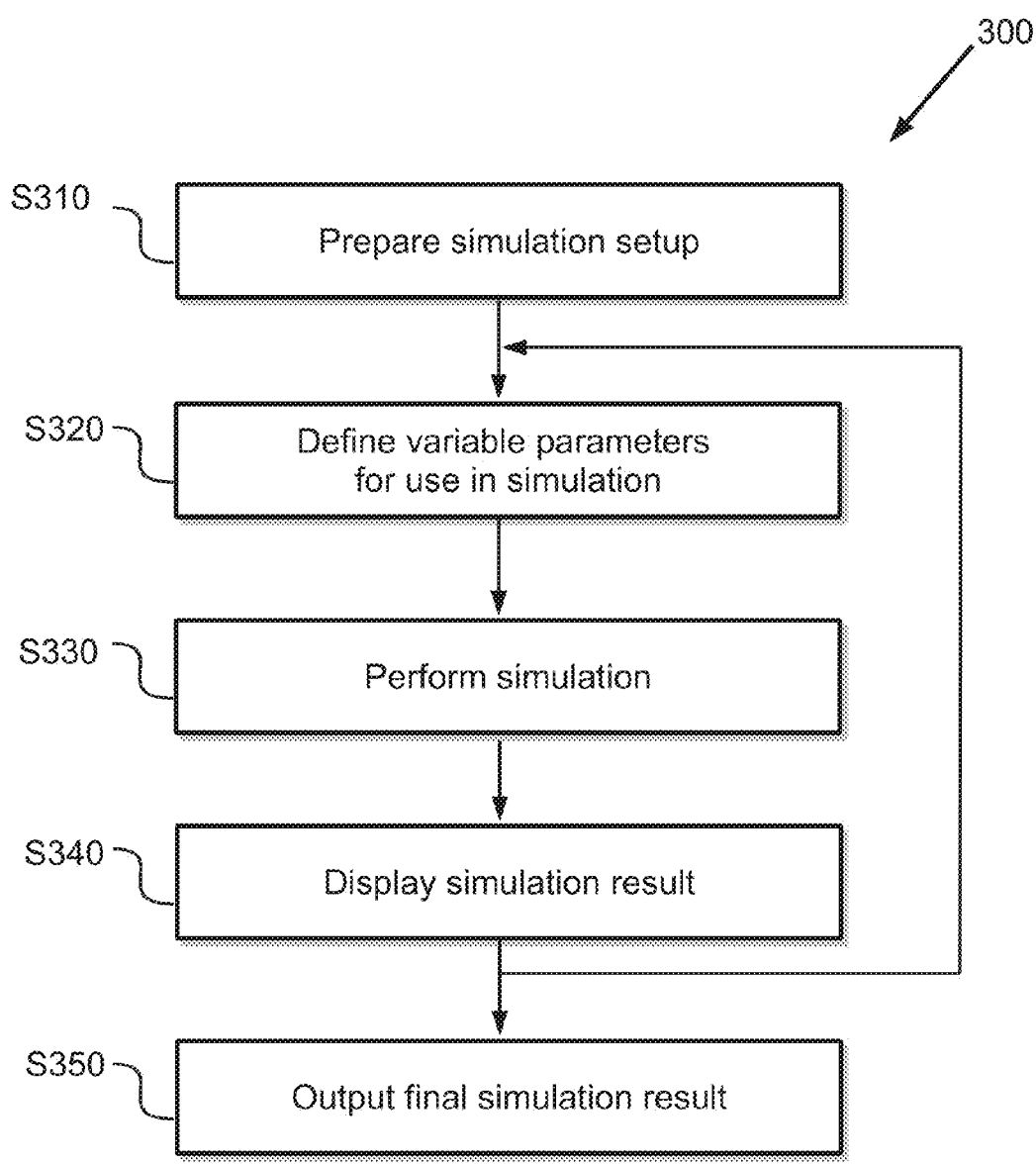
FIG. 3 is a flow chart that illustrates a method in accordance with some embodiments.

FIG. 3 is a flow chart that illustrates an exemplary method 300 in accordance with some embodiments. In an embodiment method 300 can form part of a design process to design a chip product that includes at least one integrated circuit to provide a system-on-chip such as, for example, system 100. Method 300 includes performing a simulation of an operation of planned system 100 if implemented as predetermined in system model 200 used in the simulation. At least one result can be a frequency spectrum of electromagnetic emission EME200(f) expected to emanate from the chip product to include planned system 100.

At S310, a simulation setup is prepared. The setup may include, in system model 200, requirements to be fulfilled and limitations to be met by system 100. A requirement may, for example, be to provide functionality such as data processing in a microcontroller. A limitation may, for example be, to keep power consumption of system 100 below a predetermined level.

At S320, variable parameters are defined to be used in the simulation and, possibly, subject to variation in an iterative use of simulation techniques described herein. For example, a time window can be defined to perform a simulation of an operation of planned system 100 with system model 200. In some implementations the time window is selected sufficiently long to accommodate modulated clock signals CL1, CL2. In particular, the time window can accommodate common multiple integer modulation periods of clock signals CL1, CL2, wherein clock signals CL1, CL2 are provided with different modulation so that any combination of clock signal level is included in the simulation and, correspondingly, electromagnetic emission spectrum EME200(f) of system model 200 can be complete. In an implementation providing a modulated clock signal in a simulation includes using an unmodulated clock signal CL1 and a modulated clock signal CL1' derived from the unmodulated clock signal CL1 so as the duration of the time window can be clocked as an exact multiple of the modulated clock signal's CL1' modulation period. At least one effect is that, using system model 200, a fast Fourier transformation can be performed on system current I200(t) to obtain a frequency spectrum of electromagnetic emission EME200(f) expected to emanate from planned system 100 in operation.

At S330, the simulation is performed by calculating currents and electromagnetic emission responsive to voltage signals such as clock signals CL1, CL2 and switching voltages applied to portions of system model 200.

At S340, as a simulation result, time dependent system current I200(t), can be output, for example, on a display; values calculated to obtain a profile of time dependent system current I200(t) can further be written into a data table to enable later use of the calculated data that represent time dependent system current I200(t) such as use as entry data in an electrical simulation of planned system 100. In some embodiments, the display can show the frequency spectrum EME200(f) of the electromagnetic emission EME200(t) calculated, using system model 200, to emanate from planned system 100.

A sequence of steps S320, S330 and S340 can be performed repeatedly, for example, for a designer to identify a combination of variable parameters the designer considers to provide a desirable result, in particular with respect to electromagnetic emission emanating from planned system 100.

At S350, a final simulation result and/or a set of variable parameters for use in system model 200 in order to operate system model 200 and obtain the electromagnetic emission spectrum according to the simulation can be output, for example, to a storage medium and/or to a monitor for review by a user. In some embodiments functionality can be added such as an export function for export of time dependent current data and/or emission spectrum data for use in calculation of at least one piece-wise linear (PWL) table that, for example, can be used in other software.

Figure 4:
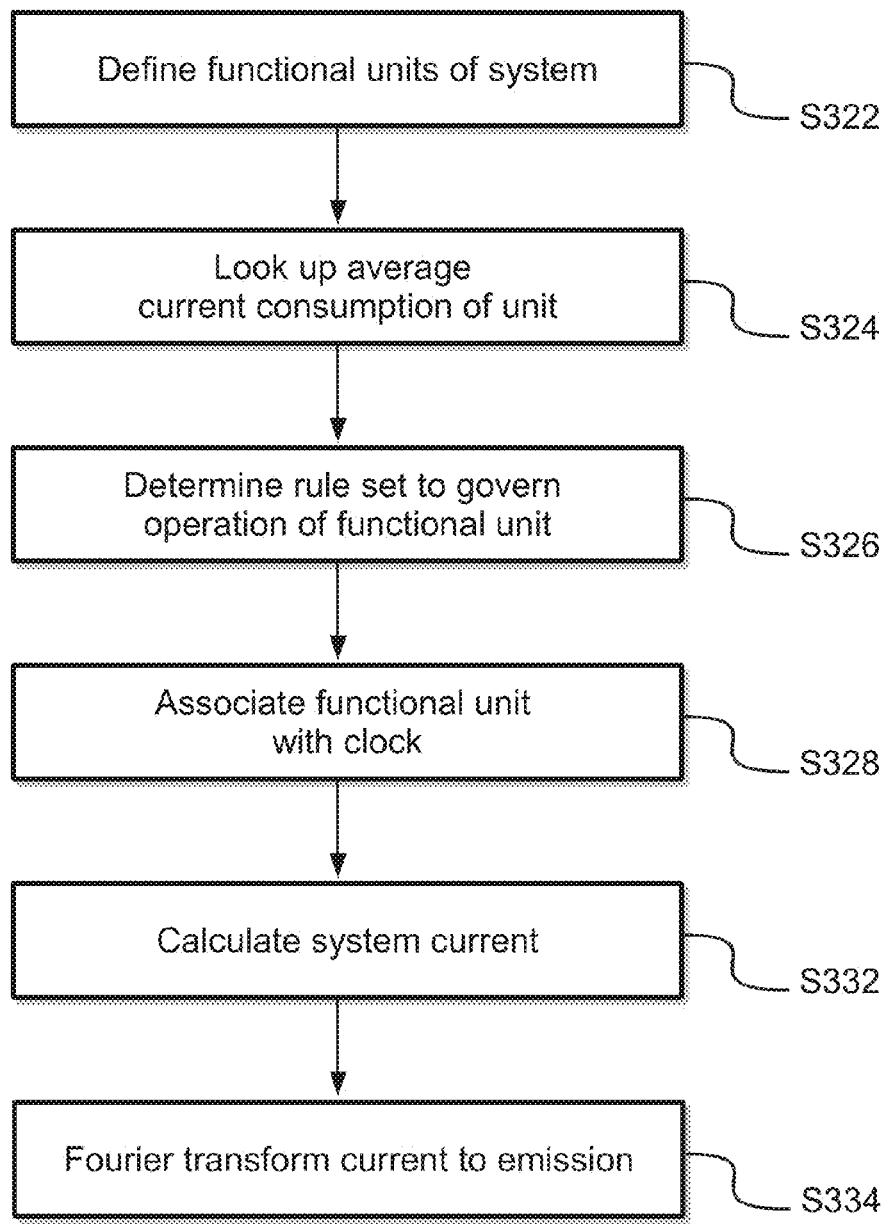
FIG. 4 is a flow chart that illustrates a portion of the exemplary method of FIG. 3 in accordance with some embodiments.

FIG. 4 is a flow chart that illustrates a portion of exemplary method 300 in accordance with some embodiments. The portion of method 300 which is illustrated in FIG. 4 can encompass steps S320, S330 and S340 for repeated use in the design process.

Forming part of S320, at S322, planned system 100 is defined to have functional units 110, 120 and 130. Planned system 100 can be planned to include other functional units (not shown) in place of or in addition to functional units 110, 120 and 130. Accordingly, system model 200 is modelled on planned system 100 and mirrors or represents functional units 110, 120, 130 of planned system 100. In particular, variations of system model 200 can be planned so as to evaluate characteristics of system model 200, whereby guidance to advantages and disadvantages of system 100 when implemented in the variations can be obtained.

Still forming part of S320, at S324, an average current consumption I210, I220 and I230, respectively, is looked up for each of functional units 110, 120, and 130 in planned system model 200. For example, an average current consumption can be obtained from a previous implementation of the respective functional unit 110, 120, 130 in another system.

Still forming part of S320, at S326, rule set R1, R2, R3 is determined to govern operation of functional unit 110, 120 and 130, respectively. In particular, rule set R1, R2, R3 can include a function and related parameters that determine time dependent current responsive to a voltage such as a signal voltage provided with a clock signal fed over time to functional unit 110, 120, 130.

Further, rule set R1, R2, R3 can determine clocking, i.e., how a given clock signal CL1, CL2 that is to be provided, as the case may be, to functional unit 110, 120 and 130 is to be used in operation of the respective functional unit. In some embodiments clocking can include skewing clock signal CL1, CL2, i.e., delaying clock signal CL1, CL2 provided to functional unit 110, 120, 130. At least one effect of skewing clock signal CL1, CL2 can be to enable an avoidance of spikes in electromagnetic emission that otherwise could result from switching multiple elements at the same time. Skewing can therefore be used in the design of system model 200 for reduction of electromagnetic emission in operation of planned system 100. Other parameters can be varied as well, for example, a duty cycle of selected clock signals CL1, CL2 can be varied, and, for example, a clock divider can be implemented to generate a low frequency clock signal from a high frequency signal.

Rule set R1, R2, R3 can determine current. In some embodiments current may be composed of variable current, herein also referred to as switching current, and of static current, herein also referred to as leakage current. In some embodiments, rule set R1, R2, R3 can define current to depend on a manufacturing process technology planned to be used in manufacturing an integrated circuit product (IC) to provide system 100 on a chip. Merely to give one example of a process technology, a 40 nm CMOS technology is stated; as the case may be, other process technologies can be used and associated rules be known for an application to simulation of system 100. Further, current can be defined to depend on an operating temperature of the IC. In some implementations current can be defined to depend on a supply voltage level used in operation of functional unit 110, 120, 130, respectively. In some implementations leakage current can be defined constant irrespective of any fast changing signal voltage. Rule set R1, R2 and R3, for example, can define leakage current to depend on at least one of process, voltage and temperature as described before with respect to switching currents. Typically, by rule of physics, static currents will not contribute to electromagnetic emissions EME210(f), EME220(f), and EME230(f), respectively.

Still forming part of S320, at S328, each functional unit 110, 120, 130, represented in system model 200 by black box 215, 225 and 235, respectively, can be associated with one clock 240, 250 to define, for each functional unit 110, 120, 130, a clock signal CL1, CL2 to be used in simulation of system model 200. In the example of system model 200 shown in FIG. 2, first functional unit 110 is associated with first clock 240, while both, second functional unit 120 and third functional unit 130, are associated with second clock 250. Correspondingly, first clock signal CL1 can be provided from first clock 240 to first black box 215, whereas second clock signal CL2 can be provided from second clock 250 to second black box 225 and to third black box 235. Clock signal CL1, CL2 can be defined by parameter values such as, for example, period, duty cycle, rising edge slope, and/or falling edge slope. In some embodiments a delay of clock signal CL1, CL2 as provided to black box 215, 225, 235 can also be predetermined. In some embodiments a clock modulation can be predetermined. Clocking will be described in more detail below with reference to FIG. 5.

Now forming part of S330, at S332, using system model 200, a simulation of an operation of system 100 can be performed, wherein black boxes 215, 225 and 235 represent functional units 110, 120 and 130 that combine input of average current I210, I220 and I230 with, as the case may be, clock signal CL1 or CL2 according to rule sets R1, R2 and R3, respectively, to output variable current I210(t), I220(t) and I230(t), respectively. Calculation of time dependent current will be described below in more detail with reference to FIGS. 6 and 7.

In the simulation, first clock signal CL1 is simulated to be generated and provided to first black box 215 and second clock signal CL2 is simulated to be generated and provided to second black box 225 and to third black box 235. The simulation can include calculation of first time dependent current I210(t) that, in operation of system 100, is expected to flow to first functional unit 110, second time dependent current I220(t) that, in operation of system 100, is expected to flow to second functional unit 120 and third time dependent current I230(t) that, in operation of system 100, is expected to flow to third functional unit 130. First, second and third time dependent currents I210(t), I220(t) and I230(t) can be summed to obtain a system time dependent current I200(t). In some implementations, post-processing is performed to take account of physical phenomena present in planned system 100 but not integrated into system model 200. For example, an effect on current of electrical damping such as due to impedance of circuit lines and other circuit elements can be 'impressed' on a calculated time dependent current I200(t). For yet another example, parasitic effects of capacitance between modules of system model 200, in particular modules located in proximity to each other, can be taken into account, for example, by integrating time dependent current across current peaks to achieve a smoothing effect on the respective current peak. Thus, a more 'realistic' current I200'(t), i.e., a current still closer to a real current can be obtained that would occur in operation of planned system 100. Further, based on first time dependent current I210(t), the simulation can include calculation of first electromagnetic emission EME210(f). Likewise, based on second and third time dependent current I220(t) and I230(t), respectively, the simulation can include calculation of second and third electromagnetic emission EME220(f) and EME230(f), respectively. The frequency spectrum of electromagnetic emission EME200(f) of system model 200 can be calculated based on system time dependent current I200(t) as a sum of contributions provided by first, second and third time dependent currents I210(t), I220(t) and I230(t), respectively.

Still forming part of S330, at S334, time dependent current I200(t) can be subjected to an operation to obtain a frequency spectrum of electromagnetic emission EME200(f) expected to emanate from a product including system 100. For example, a fast Fourier transformation (FFT) can be performed on time dependent current I200(t).

As described above, steps S320 and S330 and S340 can be performed repeatedly planning system 100 with different functional units 110, 120, 130 and associated description of parameters, process technologies, master clock signal, clock signals CL1, CL2, delay of clock signals CL1, CL2 provided to functional units 110, 120, 130, and/or other parameters that can determine the resultant frequency spectrum of electromagnetic emission EME200(f). At least one effect can be to enable an optimisation of electromagnetic emission in terms of predetermined criteria. Criteria can be, for example, a minimisation of electromagnetic emission in a frequency range as desired by a user. In some implementations a frequency modulation period sequence, accumulated jitter over time and other properties can be displayed. In some implementations data that are representative of an electromagnetic emission spectrum such as emission envelope data can be saved to a storage medium for comparison with like data generated using a different configuration from the one used to generate the stored data. Thereby, a user can individually assess system qualities, in particular advantages and disadvantages with respect to electromagnetic emission of a configuration of functional units that gave rise to the stored electromagnetic emission spectrum and compare the same with corresponding values of same parameters resultant from generating electromagnetic emission frequency envelope data using the different configuration.

Figure 5:
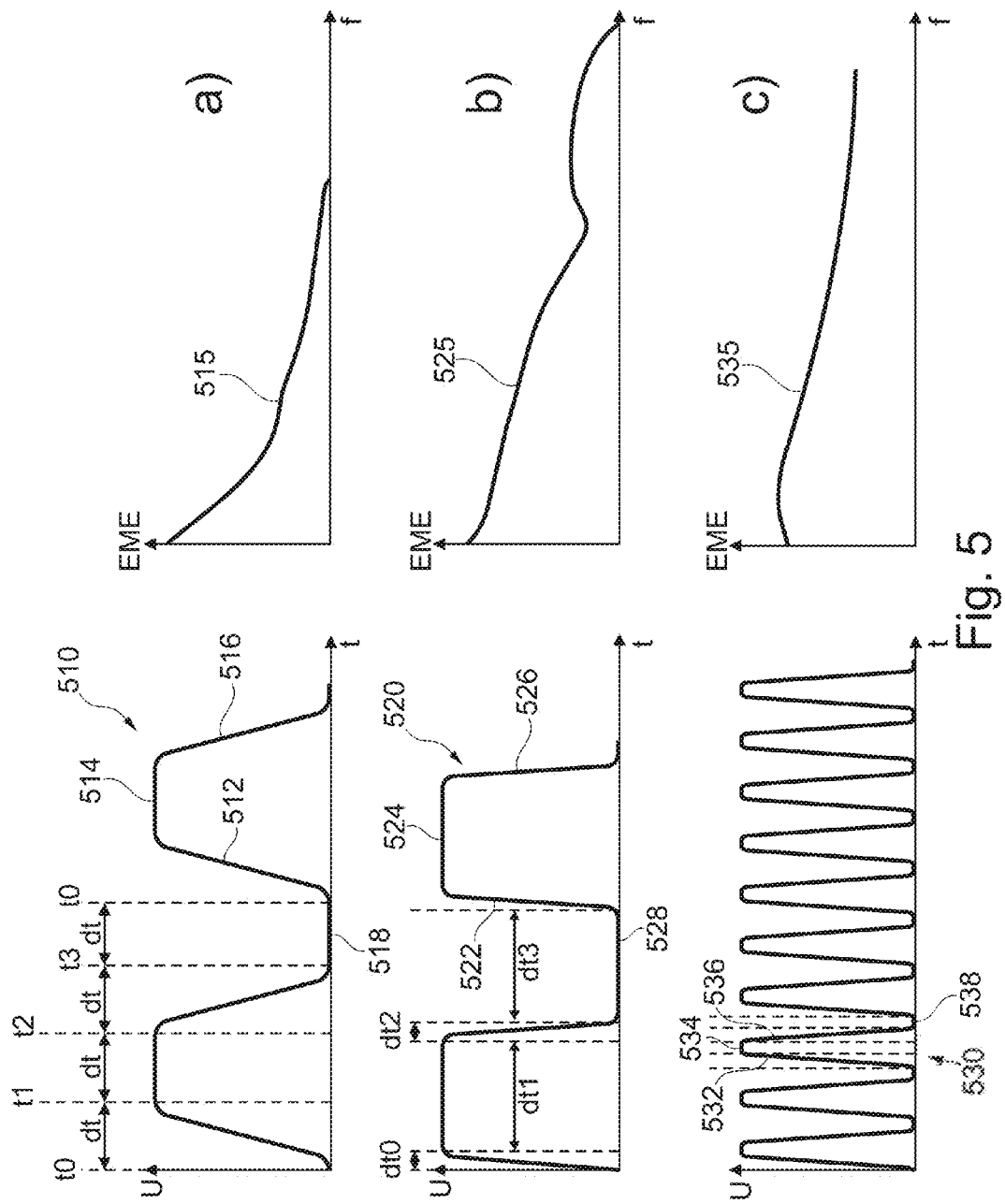
FIG. 5 is a diagram that illustrates schematically embodiments of a clock pulse model in accordance with some implementations.

FIG. 5 is a diagram that illustrates schematically embodiments of a clock pulse model in accordance with some implementations and effects of varying clock current signal shape on a frequency spectrum of electromagnetic emission. Exemplary trapezoid clock signal pulses 510, 520 and 530 of three different cases, referred to as (a), (b) and (c), are shown. Each case (a), (b) and (c) could, for example, be used in one or both of clock signals CL1 and CL2. The clock signal's current amplitude I in each case can be set, for example, to I=2 Ampère.

In case (a) clock signal has a frequency of f510=100 MHz, and a duty cycle of 50%. It should be understood that the values stated herein are meant in no way to limit the disclosure to these values but are only selected to give an example;

the person skilled in the art can use different values that reflect design options, needs or other criteria, as the case may be. Given f=1/T, a period of the clock signal including clock signal pulse 510, i.e., a length of clock signal pulse 510 is T510=10 ns. As shown on the left-hand side of FIG. 5 with reference to two successive clock signal pulses, each passing, relative to pulse start point t0, through points in time t1, t2 and t3, clock signal pulse 510, during a time interval dt, from start point t0 to point in time t1, has a rising edge 512, during a time interval dt, from t1 to t2, a high level signal portion 514, during a time interval dt, from t2 to t3, a falling edge 516, and during a time interval dt from t3 to t0 of a successive clock signal pulse 510 has a low level signal portion 518. Rise time of clock signal pulse 510 and also fall time of clock signal pulse 510 are set to one quarter of period T510. Consequently, rising edge 512 and falling edge 516 each last dt=2.5 ns; likewise high level signal portion 514 and low level signal portion 518 last dt=2.5 ns. On the right-hand side of FIG. 5, electromagnetic emission spectrum EME510($f$) is shown, at reference numeral 515, for later comparison with electromagnetic emission spectra EME520($f$) and EME530($f$) in other cases (b) and (c).

In case (b) clock signal pulse 520 has a frequency f520=100 MHz, and a duty cycle of 50%. A period of the clock signal including clock signal pulse 520 is T520=10 ns. Clock signal pulse 520 has a rising edge 522, a high level signal portion 524, a falling edge 526 and a low level signal portion 528. Rise time of clock signal pulse 520 and also fall time of clock signal pulse 520 are set to one twentieth of period T520. Consequently, rising edge 522 and falling edge 526 each last a duration of dt0=dt2=0.5 ns, whereas high level signal portion 524 and low level signal portion 528 each last dt1=dt3=4.5 ns. On the right-hand side of FIG. 5, electromagnetic emission spectrum EME520($f$), at reference numeral 525, in case (b) is shown for comparison with electromagnetic emission spectrum EME510($f$) in case (a). When compared with case (a), shorter rise time and fall time in case (b) effect a larger portion of electromagnetic emission EME520($f$) at higher frequencies.

In case (c) clock signal pulse 530 has a frequency f530=500 MHz, and a duty cycle of 50%. A period of clock signal including clock signal pulse 530 is T530=2 ns. Clock signal pulse 530 has a rising edge 532, a high level signal portion 534, a falling edge 536, and a low level signal portion 538. Rise time of clock signal pulse 530 and also fall time of clock signal pulse 530 are set to one quarter of period T530. Consequently, rising edge 532 and falling edge 536 as well as high level signal portion 534 and low level signal portion 538 each last 0.5 ns. On the right-hand side of FIG. 5, electromagnetic emission spectrum EME530($f$), at reference numeral 535, in case (c) is shown for comparison with electromagnetic emission spectrum EME510($f$) in case (a), and with electromagnetic emission spectrum EME520($f$) in case (b). When compared with case (a), shorter rise time, high level signal portion time and fall time in case (c) effect a larger portion of electromagnetic emission EME530($f$) at higher frequencies. Also, when compared with case (b), a shorter high level signal portion time effects a larger portion of electromagnetic emission EME530($f$) at higher frequencies.

As described above, functional units 110, 120 and 130 are each characterized by average dynamic current I210, I220 and I230, respectively, corresponding to an integration based on dynamic clock signalling over time. Applying the methods disclosed herein in system model 200 enables a user planning on designing system 100 to identify, for a given set of functional units 110, 120, 130, clock schemes that can be desirable.

Now having regard to dynamic currents that can give rise to electromagnetic emission, a calculation of a current shape over time is done considering a rising clock signal edge and falling clock signal edge as discussed above which can cause current pulses by switching transistors in functional units 110, 120, and 130. In some embodiments this can be performed on logic transistors and/or on Input/Output (I/O) transistors, as used to drive input/output pads.

In planned system 100, portions of clock signal pulse 510, 520, 530 can be associated with a functional process to be performed in planned system 100. For example, simulation of an operation of planned system 100 performed using system model 200 can associate, with rising edge 512 of clock signal pulse 510 in first clock signal CL1, receiving, in master latches of registers, data from circuit elements 111, 112, 113. Further, irrespective of current associated with rising edge 512 still continuing to flow, high level portion 514 of clock signal pulse 510 can be associated with no new activity, in particular, with no data being written to registers. It should be understood that rise and fall of current are to be completed within a duration that it takes clock signal pulse 510 to rise from low level to high level and stay in the high level, i.e., within a sum of the duration of rising edge 512 and high level portion 514. Falling edge 516 of clock signal pulse 510 can be associated with reading of data from master latches of the registers and writing the data to slave latches of the registers. Data received in the registers of slave latches form new data which is provided to first, second and third circuit elements 111, 112, 113 in first functional unit 110. Further, irrespective of current associated with falling edge 516 still continuing to flow, low level portion 518 of clock signal pulse 510 can be associated with no new activity. It should be understood that rise and fall of current are to be completed within a duration that it takes clock signal pulse 510 to fall from high level to low level and stay in the low level, i.e., within a sum of the duration of falling edge 516 and low level portion 518. In another implementation the association of rising clock edge 512 and of falling clock edge 516 with master latch activity and slave latch activity can be reversed. The operation of first clock signal CL1 provided by first clock 240 disclosed as an example with respect to circuit elements 111, 112, 113 of first functional unit 110 can likewise apply to other functional units 120, 130 clocked by other clock signals CL2 provided by other clocks 250.

In some embodiments the transistors can charge or discharge capacitive nodes, wherein current flow follows an exponential function. Mathematically, i.e., in theory, a starting current peak with a clock signal pulse starting at t0 is reached immediately. In the example of FIG. 5, case (a), 'immediately' means that the current peak is thus reached after a non-zero duration dt at t1 which is the time when clock signal's rising edge 512 reaches signal's high level signal portion 514.

Figure 6:
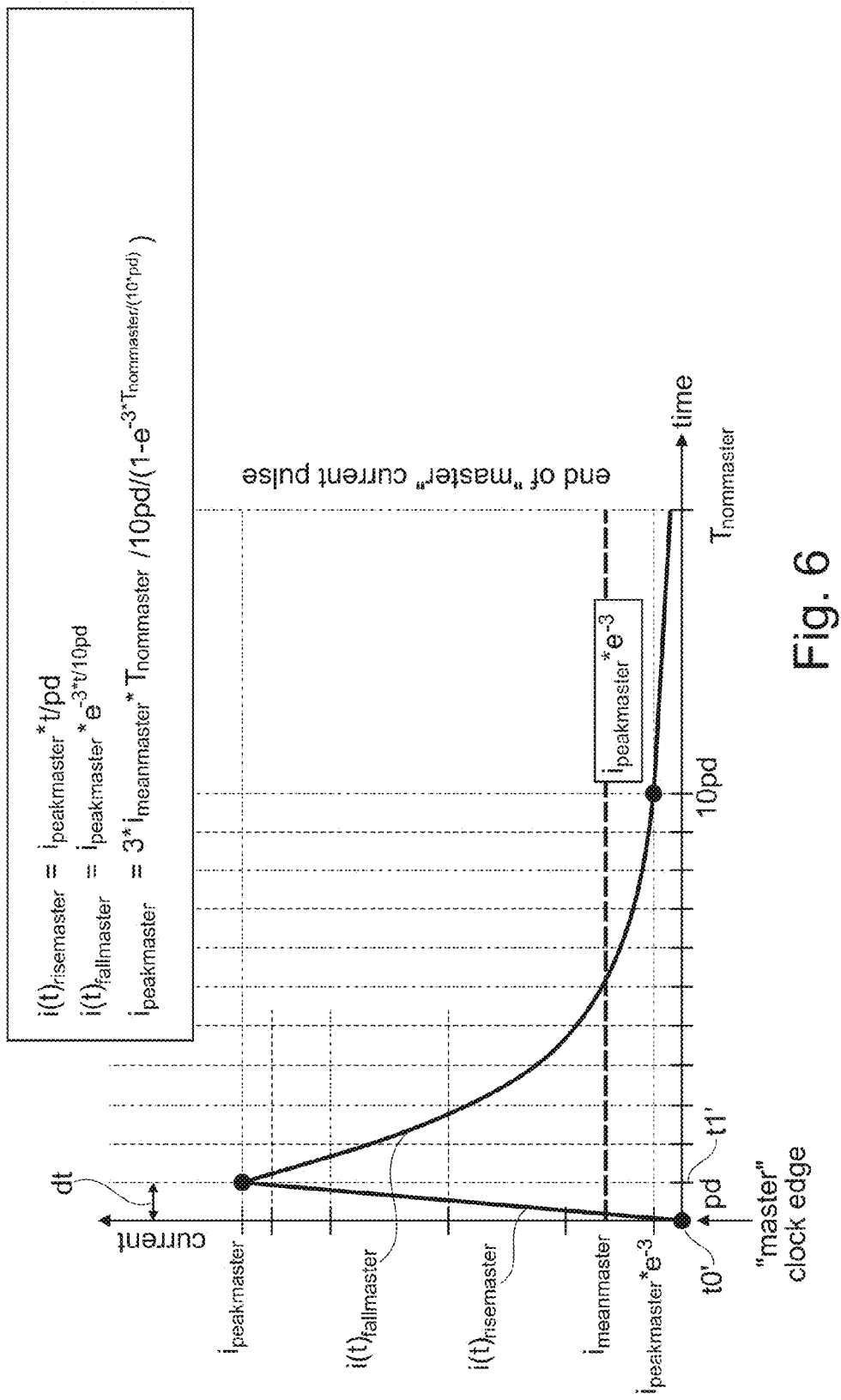
FIG. 6 is a diagram that illustrates schematically a current pulse model in accordance with some implementations.

FIG. 6 is a diagram that illustrates schematically a first current pulse model in accordance with some implementations. The current pulse shown in FIG. 6 can form part of, for example, time dependent current I110($t$). The current pulse can be associated with a 'master' clock edge, e.g., the rising edge 512 of clock signal pulse 510. In order to take account of time needed for signal propagation through circuitry, a propagation delay value pd can be defined. The propagation delay value pd can depend, for example, on manufacturing process technology planned to be used in manufacturing a product to incorporate planned system 100 and/or on a predetermined library comprising functional blocks and used to provide functional blocks 110, 120, 130. Since, in the case of the 'master' clock edge (rising edge 512 of clock signal pulse 510) all flipflops are immediately triggered by clock edge 512, a duration for current $i(t)_{risemaster}$ to rise to a peak value (denoted $i_{peakmaster}$) can be set equal to the duration dt of rising edge 512 in clock signal pulse 510, and thus propagation delay value pd=dt, with the current $i(t)_{risemaster}$ rising linearly from $i(t0')=0$ to $i(t1')=i_{peakmaster}$. Next, decay of current I110(t) sets on. In the exemplary embodiment illustrated in FIG. 6, current decay follows an exponential function $i(t)_{fallmaster}$.

Figure 7:
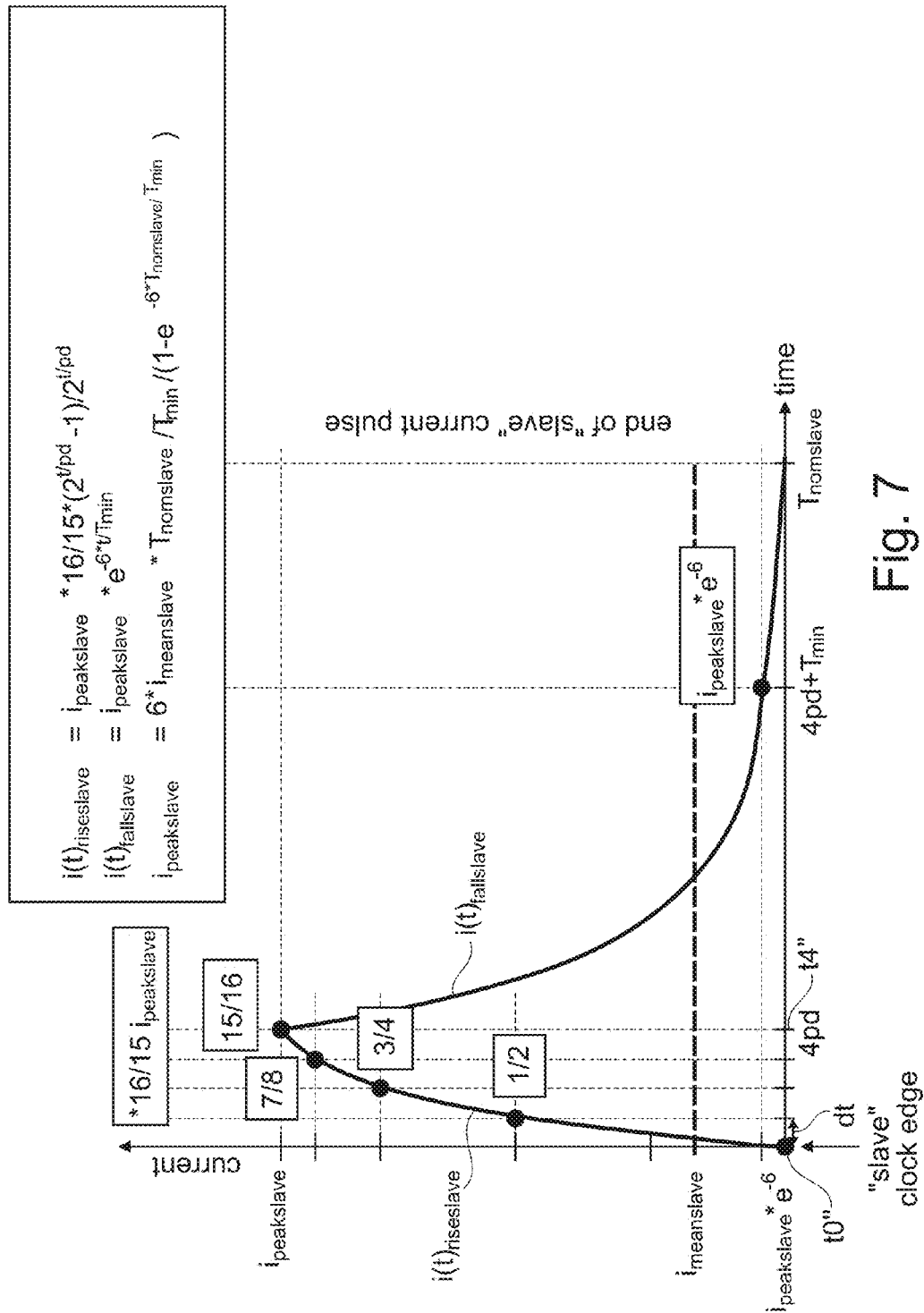
FIG. 7 is another diagram that illustrates schematically a further current pulse model in accordance with some implementations.

FIG. 7 is another diagram that illustrates schematically a second current pulse model in accordance with some implementations. Like the current pulse shown in FIG. 6, the current pulse shown in FIG. 7 can also form part, for example, of time dependent current I110(t). The current pulse can be associated with a 'slave' clock edge, e.g., the falling edge 516 of clock signal pulse 510. Since, in a real operation of planned system 100, a signal pattern released by 'slave' clock edge 516 ripples through elements of the circuitry, current may not immediately rise to its peak value. In system model 200, current $i(t)_{riseslave}$ increases stepwise when a signal pattern released by a falling clock edge to take account of propagation delay and reflect that current ripples through circuit elements 111, 112, 113 (and many more circuit elements that may be present but are not shown in the example of FIG. 1) of the integrated circuit comprised in functional unit 110 in planned system 100. In the example shown in FIG. 7 a four stage logic depth value causes current $i(t)_{riseslave}$ to rise from zero to its peak (denoted $i_{peakslave}$) during a duration of 4 pd. Current function $i(t)_{riseslave}$ can be approximated by successive increase of current by ratios 1/2, 1/4, 1/8, and 1/16 of a current $i_{peakrise}$ to the value $i_{peakslave}=15/16*i_{peakrise}$ reached at point in time t4. At t4", considering an operation of planned system 100, flip-flops, in the case of first clock signal CL1, in functional unit 110 or, in the case of second clock signal CL2, in functional units 120, 130, are simultaneously active. In the exemplary embodiment illustrated in FIG. 7, current I110(t) decays following an exponential function $i(t)_{fallslave}$ similar to what was described above with reference to current decay in the case of dynamic current I110(t) associated with the 'master' clock edge.

It should be understood that, other than the condition of rise and fall of current to be completed within an interval of a duration that the clock signal takes to change level and keep the level before changing again, the timing of the current flow can differ from the timing of the clock voltage signal. Accordingly, merely to give one example, point in time t0 in FIG. 5 is not necessarily the same as point in time t0' in FIG. 6. In some implementations a ratio between current content in the "rising" current pulse (for example, the current $i(t)_{riseslave}$ associated with a falling edge 516 in the clock pulse 510) to store a new signal pattern, and a sum of current content in the "rising" current pulse plus current content in the "falling" current pulse (for example, the current $i(t)_{riseslave}+i(t)_{fallslave}$ still associated with a falling edge 516 in clock pulse 510), can be scaled individually. Further, total current can be varied. This allows to select e.g. similar current distribution for core logic modules and to select asymmetric current ratios for pad drivers. Within one clock signal period, an integral of current I110(t) below rising and falling clock signal edges, i.e., in the interval from t0 of the present clock signal pulse 510 to t0 of a next clock signal pulse, must be equal to the integral of constant mean current in that interval.

It should be understood that the afore-described dynamics used in system model 200 are not limited to the exemplary circuitry disclosed in the present examples shown in FIG. 1 and discussed herein. Tens, hundreds, thousands of functional units can be defined to be used in a single system, each functional unit comprising 'uncountably' many flip-flops or other circuit elements rather than merely two to four circuit elements as shown in FIG. 1. Different current decay times can apply to different functional units, in particular to a functional unit comprising only logic transistors and/or to a functional unit comprising only Input/Output (I/O) transistors, since a capacitance of logic transistors in many embodiments is much smaller than a capacitance of I/O transistors. For example, pad drivers will take a longer time to charge discharge their nF loads than logic gates to drive their fF or pF loads. Consequently, decay of logic transistor current can take place much faster than decay of I/O transistor current.

This description, in an aspect according to some embodiments, describes a method for use in design of a system, the system to include a plurality of sources contributing to a variable system effect.

The method can comprise determining a plurality of functional units to form the system, each functional unit including a separate subset of sources in the plurality of sources; obtaining a plurality of constant functional unit source informations, wherein each constant functional unit source information is associated with a respective functional unit in the plurality of functional units; determining at least one variable quantity, associating each functional unit with one of the at least one variable quantity; for each functional unit in the plurality of functional units, obtaining variable functional unit source information by combining the constant functional unit source information with the variable quantity associated with the functional unit, and deriving the variable system effect based on combining the variable functional unit source informations, for example, by adding up source values comprised in the variable functional unit source informations to obtain variable system source value readily transformed into the variable system effect. An effect can be that a conventional calculation of effects of individual sources in the plurality of sources can be avoided in determining the system effect. Savings thus made, for example, in terms of processing time can allow to spend given processing resources on calculating a larger number of design variations and thus allow to investigate a larger design solution space than conventional methods. In some embodiments the at least one variable quantity is a time-dependent signal. Some embodiments can further comprise providing at least one clock information, wherein the at least one clock information defines the time-dependent signal as a clock signal for use with at least one functional unit in the plurality of functional units. The system can include a circuit. The plurality of functional units can each correspond to one in a corresponding plurality of circuit blocks. The plurality of sources can be provided by time-dependent current flow in the circuit. The variable system effect can be frequency-dependent electromagnetic radiation. A spectrum of the frequency-dependent electromagnetic emission can, for example, be obtained by performing a Fourier transformation on time-dependent system current values provided as a sum of time-dependent functional unit current values. In some embodiments the constant functional unit source information includes a mean current consumption of the circuit block. The constant functional unit source information can further include propagation delay information representative of a duration of signal propagation inside the circuit block.

In one aspect a device for use in design of a system is also disclosed. The system can be designed to include a plurality of sources contributing to a variable system effect. The device can comprise a link configured for access to a library comprising a plurality of constant functional unit source informations, wherein each constant functional unit source information is associated with a respective functional unit in a plurality of functional units. The library can further comprise at least one variable quantity information. In some embodiments the library can form part of the device, for example, by having data representative of information comprised in the library stored in a storage medium included in or otherwise coupled to the device. The device can comprise a configurator configured for selecting a plurality of functional units to form the system, each functional unit including a separate subset of sources in the plurality of sources. In some embodiments the configurator can further be configured for associating each functional unit with one of the at least one variable quantity information. The device can comprise a simulator configured for obtaining, for each functional unit in the plurality of functional units, variable functional unit source information by combining the constant functional unit source information with the variable quantity information associated with the functional unit. In some embodiments the simulator is further configured for deriving the variable system effect based on combining the variable functional unit source informations. In some embodiments the at least one variable quantity information defines a time-dependent signal. At least one variable quantity information can define the time-dependent signal as a clock signal for use with at least one functional unit in the plurality of functional units. In some embodiments the system includes a circuit, and the plurality of functional units represents a plurality of circuit blocks, respectively. The source can represent time-dependent current flow in the circuit. The variable system effect can represent frequency-dependent electromagnetic radiation. In some embodiments the constant functional unit source information includes a mean current consumption of the circuit block. The constant functional unit source information can further include propagation delay information representative of a duration of signal propagation inside the circuit block.

In yet another aspect a tangible computer-readable medium storing instruction code thereon is disclosed, that when executed causes one or more processors to perform steps for design of a system, the system to include a plurality of sources contributing to a variable system effect. Steps can comprise determining a plurality of functional units to form the system, each functional unit including a separate subset of sources in the plurality of sources; obtaining a plurality of constant functional unit source informations, wherein each constant functional unit source information is associated with a respective functional unit in the plurality of functional units; determining at least one variable quantity; associating each functional unit with one of the at least one variable quantity; for each functional unit in the plurality of functional units, obtain variable functional unit source information by combining the constant functional unit source information with the variable quantity associated with the functional unit; and deriving the variable system effect based on combining the variable functional unit source informations. The at least one variable quantity can be a time-dependent signal. In some embodiments the instruction code, when executed can cause one or more processors to perform providing at least one clock information, wherein the at least one clock information defines the time-dependent signal as a clock signal for use with at least one functional unit in the plurality of functional units. The system can include a circuit, the plurality of functional units corresponding to a plurality of circuit blocks, respectively, wherein the source can be time-dependent current flow in the circuit, and wherein the variable system effect can be frequency-dependent electromagnetic radiation. In some embodiments the constant functional unit source information includes a mean current consumption of the circuit block. The constant functional unit source information can further include propagation delay information representative of a duration of signal propagation inside the circuit block.

Another embodiment comprises determining a plurality of aggregates each having a subset of sources in the plurality of sources. In an embodiment the subsets of sources in the plurality of sources are disjunct. In an embodiment each source in the plurality of sources is associated with one of the disjunct subsets. An embodiment comprises obtaining a plurality of constant aggregate source informations. In an embodiment each constant aggregate source information is associated with a respective aggregate in the plurality of aggregates. An embodiment comprises deriving the variable system effect based on the plurality of constant aggregate source informations. In an embodiment the deriving includes determining a plurality of variable aggregate sources based on a variable quantity. At least one effect can be that information readily available for aggregates can be used instead of information about variable effects for each of the plurality of sources in order to derive variable effects of the system, in particular dynamic effects of the system.

In an embodiment each variable aggregate source is associated with one respective aggregate in the plurality of aggregates. At least one effect can be that multiple counting of a source effect is avoided. In an embodiment the variable quantity is time. At least one effect can be that time dependent effects, in particular dynamic effects, can be determined. An embodiment comprises providing at least one clock information. In an embodiment the at least one clock information can be associated with at least one variable aggregate source. At least one effect can be that clock information can be used to determine time and/or frequency dependent effects. An embodiment comprises associating at least one variable aggregate source in the plurality of variable aggregate sources with a clock information in the plurality of clock informations. At least one effect can be that clock information can be used to determine time and frequency dependent effects of the at least variable aggregate source as well as a time and frequency dependent effect cumulative for the system.

In an embodiment the source is flow. At least one effect can be that interdependencies between aggregates can be determined where flow is directed from one aggregate to another. In an embodiment the flow is current. At least one effect can be that current dependent effects can be determined. In an embodiment the effect is electromagnetic radiation. At least one effect can be that the system's electromagnetic radiation can be determined based on current provided to the aggregates. In an embodiment the system is a circuit.

In an embodiment the plurality of aggregates corresponds to a plurality of function blocks. At least one effect can be that circuit effects such as electromagnetic emission can be determined for the system comprising the function blocks. In an embodiment the function blocks are provided as function circuit blocks.

In an embodiment the system is a circuit. In an embodiment the plurality of aggregates corresponds to a plurality of function blocks. At least one effect can be that circuit effects such as electromagnetic emission can be determined for the system comprising the function blocks. In an embodiment the function blocks are provided as function circuit blocks.

Other implementations of techniques disclosed herein may relate to other systems or system models involving sources and effects, where sources can be aggregated and constant aggregate source information is available to enable deriving of the variable system effect. Systems can be physical systems such as an environmental system, technical systems such as a processing plant, communication systems such as the Internet, social systems such as a social network, economic systems such as a market, or other systems. Effects can be, for example, temperature, process heat, data throughput, level of user acceptance, price of a traded item, or any other effect of interest. Constant aggregate source information can encompass physical properties, laws applicable to the source aggregates, behavioural type information, social group information, and other constant information. The deriving can include a simulation, a calculation, a classification by stereotypes associated with stereotype behaviour, or other methods applicable to the respective constant aggregate source information. A variable quantity can be time, volume of process matter, age of network participants, liquidity of market participants, and any other variable upon which the respective effect depends. At least one effect is that the effect of interest can be derived using less resources such as processing power than in a conventional way of obtaining the system effect using individual variable source information. In some cases the techniques disclosed herein may overcome a prohibitive technical obstacle to determination of the system effect when using a conventional method.

The word 'exemplary' is used herein to mean serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion. The term 'techniques,' for instance, may refer to one or more devices, apparatuses, systems, methods, articles of manufacture, and/or computer-readable instructions as indicated by the context described herein. The term 'processor-readable medium' includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

It is to be understood that the features of the various embodiments described herein may be combined with each other, unless specifically noted otherwise. Although specific embodiments have been illustrated and described herein, it will be appreciated by those of ordinary skill in the art that a variety of alternate and/or equivalent implementations may be substituted for the specific embodiments shown and described without departing from the scope of the present invention. For example, where some implementations were described above with respect to a first and a second functionality, other un-illustrated implementations can include only the first functionality (not second functionality) or can include only the first functionality (not the second functionality). Other permutations and combinations of the above-disclosed concepts are also contemplated as falling within the scope of the disclosure. The disclosure includes all such modifications and alterations and is limited only by the scope of the following claims. This application is intended to cover any adaptations or variations of the specific embodiments discussed herein. It is intended that this invention be limited only by the claims and the equivalents thereof. The implementations herein are described in terms of exemplary embodiments. Exemplary implementations/embodiments discussed herein may have various components collocated. However, it should be appreciated that individual aspects of the implementations may be separately claimed and one or more of the features of the various embodiments may be combined. The order in which the embodiments/implementations and methods/processes are described is not intended to be construed as a limitation, and any number of the described implementations and processes may be combined. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. While a particular feature of the disclosure may have been disclosed with respect to only one of several implementations, such feature may be combined with one or more other features of the other implementations as may be desired and advantageous for any given or particular application.

Depending on certain implementation requirements, embodiments of the invention can be implemented in hardware or in software. Generally, the embodiments described herein can be implemented as a computer program product with a program code, the program code being operative for performing one of the methods when the computer program product runs on a computer. The program code may for example be stored on a machine readable carrier. One embodiment is a data carrier (or a digital storage medium, or a computer-readable medium) including, recorded thereon, the computer program for performing one of the methods described herein. The data carrier, the digital storage medium or the recorded medium are typically tangible and/or non-transitory. One embodiment includes a processing means, for example a computer, or a programmable logic device, configured to or adapted to perform one of the methods described herein. One embodiment includes a computer having installed thereon the computer program for performing one of the methods described herein. In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Arrangements, procedures and protocols of the described implementations may be implemented on a special purpose computer, a programmed microprocessor or micro-controller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, or the like. In general, any apparatus capable of implementing a state machine that is in turn capable of implementing the methodology described and illustrated herein may be used to implement the various methods, protocols and techniques according to the implementations. The disclosed arrangements may be implemented partially or fully in hardware using logic circuits or VLSI design. The communication arrangements, procedures and protocols described and illustrated herein as well as variations thereof may be readily implemented in hardware and/or software using any known or later developed systems or structures, devices and/or software by those of ordinary skill in the applicable art from the functional description provided herein and with a general basic knowledge of the computer arts. The disclosed procedures may be readily implemented in software that can be stored on a computer-readable storage medium, executed on a programmed general-purpose computer with the co-operation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

What is claimed is:

1. A method for use in design of a system, the system to include a circuit and a plurality of sources contributing to a variable system effect, wherein the plurality of sources is provided by time-dependent current flow in the circuit, and wherein the variable system effect is frequency-dependent electromagnetic radiation, the method comprising:
    determining a plurality of functional units corresponding to a plurality of circuit blocks to form the system, each functional unit including a separate subset of sources in the plurality of sources;
    obtaining a plurality of constant functional unit source information, wherein each constant functional unit source information is associated with a respective functional unit in the plurality of functional units;
    determining at least one variable quantity;
    associating each functional unit with one of the at least one variable quantity;
    for each functional unit in the plurality of functional units, obtaining variable functional unit source information by combining the constant functional unit source information with the variable quantity associated with the functional unit; and
    deriving the variable system effect based on combining the variable functional unit source information.

2. The method of claim 1, wherein the at least one variable quantity is a time-dependent signal.

3. The method of claim 2, further comprising:
    providing at least one clock information, wherein the at least one clock information defines the time-dependent signal as a clock signal for use with at least one functional unit in the plurality of functional units.

4. The method of claim 1, wherein the constant functional unit source information includes a mean current consumption of the circuit block.

5. The method of claim 1, wherein the constant functional unit source information includes propagation delay information representative of a duration of signal propagation inside the circuit block.

6. A device for use in design of a system, the system to include a circuit and a plurality of sources contributing to a variable system effect, wherein the plurality of sources is provided by time-dependent current flow in the circuit, and wherein the variable system effect is frequency-dependent electromagnetic radiation, the device comprising:
    a link configured for access to a library comprising a plurality of constant functional unit source information, wherein each constant functional unit source information is associated with a respective functional unit in a plurality of functional units corresponding to a plurality of circuit blocks;
    a configurator configured for selecting a plurality of functional units to form the system, each functional unit to include a separate subset of sources in the plurality of sources, the configurator further being configured for associating each functional unit with associated variable quantity information; and
    a simulator configured for obtaining, for each functional unit in the plurality of functional units, variable functional unit source information by combining the constant functional unit source information with the variable quantity information associated with the functional unit, the simulator further being configured for deriving the variable system effect based on combining the variable functional unit source information.

7. The device of claim 6, wherein the associated variable quantity information for one functional unit identifies a time-dependent signal in a plurality of time-dependent signals that are available to be associated with at least one other functional unit in the plurality of functional units.

8. The device of claim 7, wherein the variable quantity information defines the time-dependent signal as a clock signal for use with at least one functional unit in the plurality of functional units.

9. The device of claim 6, wherein the constant functional unit source information includes a mean current consumption value for the circuit block.

10. The device of claim 6, wherein the constant functional unit source information includes propagation delay information representative of a duration of signal propagation inside the circuit block.

11. A tangible computer-readable medium storing instruction code thereon, that when executed causes one or more processors to perform steps for design of a system, the system to include a circuit and a plurality of sources contributing to a variable system effect, wherein the variable system effect is frequency-dependent electromagnetic radiation, the steps comprising:
    determining a plurality of functional units to form the system, wherein the plurality of functional units corresponds to a plurality of circuit blocks, each functional unit including a separate subset of sources in the plurality of sources, wherein the plurality of sources is provided by time-dependent current flow in the circuit;
    obtaining a plurality of constant functional unit source information, wherein each constant functional unit source information is associated with a respective functional unit in the plurality of functional units;
    determining at least one variable quantity;
    associating each functional unit with one of the at least one variable quantity;
    for each functional unit in the plurality of functional units, obtain variable functional unit source information by combining the constant functional unit source information with the variable quantity associated with the functional unit; and
    deriving the variable system effect based on combining the variable functional unit source information.

12. The tangible computer-readable medium of claim 11, wherein the at least one variable quantity is a time-dependent signal.

13. The tangible computer-readable medium of claim 12, wherein the instruction code, when executed causes one or more processors to perform:
    providing at least one clock information, wherein the at least one clock information defines the time-dependent signal as a clock signal for use with at least one functional unit in the plurality of functional units.

14. The tangible computer-readable medium of claim 11, wherein the constant functional unit source information includes a mean current consumption value for the circuit block.

15. The tangible computer-readable medium of claim 11, wherein the constant functional unit source information includes propagation delay information representative of a duration of signal propagation inside the circuit block.

16. A method for use in design of a system, the system to include a circuit and a plurality of sources contributing to a variable system effect, the method comprising:
   determining a plurality of functional units to form the system, wherein the plurality of functional units corresponds to a plurality of circuit blocks, each functional unit including a separate subset of sources in the plurality of sources;
   obtaining a plurality of constant functional unit source information, wherein each constant functional unit source information is associated with a respective functional unit in the plurality of functional units, wherein the constant functional unit source information includes a mean current consumption of the circuit block;
   determining at least one variable quantity;
   associating each functional unit with one of the at least one variable quantity;
   for each functional unit in the plurality of functional units, obtaining variable functional unit source information by combining the constant functional unit source information with the variable quantity associated with the functional unit; and
   deriving the variable system effect based on combining the variable functional unit source information.

17. A device for use in design of a system, the system to include a circuit and a plurality of sources contributing to a variable system effect, the device comprising:
   a link configured for access to a library comprising a plurality of constant functional unit source information, wherein each constant functional unit source information is associated with a respective functional unit in a plurality of functional units, wherein the constant functional unit source information includes a mean current consumption value for the circuit block;
   a configurator configured for selecting a plurality of functional units to form the system, each functional unit to include a separate subset of sources in the plurality of sources, wherein the plurality of functional units represents a plurality of circuit blocks, the configurator further being configured for associating each functional unit with associated variable quantity information; and
   a simulator configured for obtaining, for each functional unit in the plurality of functional units, variable functional unit source information by combining the constant functional unit source information with the variable quantity information associated with the functional unit, the simulator further being configured for deriving the variable system effect based on combining the variable functional unit source information.

18. The device of claim 17, wherein the associated variable quantity information for one functional unit identifies a time-dependent signal in a plurality of time-dependent signals that are available to be associated with at least one other functional unit in the plurality of functional units, and wherein the variable quantity information defines the time-dependent signal as a clock signal for use with at least one functional unit in the plurality of functional units.

19. The device of claim 18, wherein the plurality of sources represents time-dependent current flow in the circuit, and wherein the variable system effect represents frequency-dependent electromagnetic radiation.

20. The device of claim 19, wherein the constant functional unit source information includes propagation delay information representative of a duration of signal propagation inside the circuit block.

21. A tangible computer-readable medium storing instruction code thereon, that when executed causes one or more processors to perform steps for design of a system, the system to include a circuit and a plurality of sources contributing to a variable system effect, the steps comprising:
   determining a plurality of functional units to form the system, each functional unit including a separate subset of sources in the plurality of sources, wherein the plurality of functional units corresponds to a plurality of circuit blocks;
   obtaining a plurality of constant functional unit source information, wherein each constant functional unit source information is associated with a respective functional unit in the plurality of functional units, wherein the constant functional unit source information includes a mean current consumption value for the circuit block;
   determining at least one variable quantity;
   associating each functional unit with one of the at least one variable quantity;
   for each functional unit in the plurality of functional units, obtain variable functional unit source information by combining the constant functional unit source information with the variable quantity associated with the functional unit; and
   deriving the variable system effect based on combining the variable functional unit source information.

\* \* \* \* \*